United States Patent
Morohoshi

(10) Patent No.: US 8,305,607 B2
(45) Date of Patent: Nov. 6, 2012

(54) METHOD OF PROCESSING DISPLAY, INCLUDING DETECTING OPERATION STATE OF COMPONENT UNIT

(75) Inventor: Hiroshi Morohoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1291 days.

(21) Appl. No.: 12/036,891

(22) Filed: Feb. 25, 2008

(65) Prior Publication Data

US 2008/0231889 A1 Sep. 25, 2008

(30) Foreign Application Priority Data

Mar. 19, 2007 (JP) .................................. 2007-071512

(51) Int. Cl.
*G06F 3/12* (2006.01)
(52) U.S. Cl. ....................................................... 358/1.15
(58) Field of Classification Search .................. None
See application file for complete search history.

(56) References Cited

U.S. PATENT DOCUMENTS 6,850,868 B2 * 2/2005 Tanaka et al. ................. 702/184

FOREIGN PATENT DOCUMENTS

| JP | 8-174967 | 7/1996 |
|---|---|---|
| JP | 2002-230200 | 8/2002 |
| JP | 2004-128820 | 4/2004 |
| JP | 2004-258961 | 9/2004 |
| JP | 2004-291530 | 10/2004 |
| JP | 2005-341340 | * 8/2005 |
| JP | 2005-341340 | 12/2005 |
| JP | 2006-251918 | 9/2006 |

* cited by examiner

*Primary Examiner* — Benny Q Tieu
*Assistant Examiner* — Jeremiah Bryar
(74) *Attorney, Agent, or Firm* — Dickstein Shapiro LLP

(57) ABSTRACT

An MFP includes sensors for detecting states of units, a transmitting/receiving unit that receives authentication information of a user ID, and an obtaining unit that obtains manual data and sensor information. The transmitting/receiving unit transmits the manual data and the sensor information to a displaying device that includes a sensor detecting unit, an authenticating unit, a transmitting/receiving unit that transmits the authentication information to the MFP and receives the manual data and the sensor information, and a display controlling unit that controls the received manual data and the sensor information to be displayed on a displaying unit.

10 Claims, 14 Drawing Sheets

FIG. 2A

| CONFIGURATION ID | MANUAL FILE NAME | SUB-MANUAL NAME |
|---|---|---|
| 001 | AAA.doc | aaa1.doc, aaa2.doc, ⋯ aaa10.doc |
| 002 | BBB.doc | bbb1.doc ⋯ bbb8.doc |
| 003 | CCC.doc | ccc1.doc ⋯ ccc5.doc |
| 004 | DDD.doc | ddd1.doc ⋯ ddd7.doc |
| 005 | EEE.doc | eee1.doc ⋯ eee5.doc |
| 006 | FFF.doc | fff1.doc ⋯ fff5.doc |
| ⋮ | ⋮ | ⋮ |

FIG. 2B

| CONFIGURATION ID | SENSOR INFORMATION LOG FILE NAME |
|---|---|
| 001 | AAA.log |
| 002 | BBB.log |
| 003 | CCC.log |
| 004 | DDD.log |
| 005 | EEE.log |
| 006 | FFF.log |
| ⋮ | ⋮ |

FIG. 2C

| DATE AND TIME | HISTORY |
|---|---|
| 20070301 15:30 | PRINT EXECUTION ERROR (ccc3) |
| 20070301 15:29 | A0050 START USE OF MFP |
| 20070301 09:02 | A0001 END USE OF MFP |
| 20070301 09:00 | EXECUTE PRINT (30 PAGES) |
| 20070301 08:59 | A0001 START USE OF MFP |
| ⋮ | ⋮ |

FIG. 11

| SUB-MANUAL | USABLE USER ID |
|---|---|
| aaa1.doc | ALL |
| aaa2.doc | A0001 TO A0050, B0001 TO B0010 |
| bbb1.doc | ALL |
| ccc1.doc | A0001 TO A0010 |
| ccc3.doc | A0001 TO A0050 |
| ⋮ | ⋮ |

METHOD OF PROCESSING DISPLAY, INCLUDING DETECTING OPERATION STATE OF COMPONENT UNIT

CROSS-REFERENCE TO RELATED APPLICATIONS

The present application claims priority to and incorporates by reference the entire contents of Japanese priority document, 2007-071512 filed in Japan on Mar. 19, 2007.

BACKGROUND OF THE INVENTION

1. Field of the Invention

The present invention relates to a technology for displaying information of each component that constitutes an image processing apparatus.

2. Description of the Related Art

In recent years, an image processing apparatus, such as a printer, includes many functions for executing image processing, image output, and the like. Since most of such functions are complex, to see the details of such complex functions, a manual (description) attached to the image processing apparatus is required. Manuals can be broadly divided into those printed on a paper medium (paper manual) and those that are electronic in the form of a Compact Disc-Read Only Memory (CD-ROM) or World Wide Web (Web) (electronic manual).

However, for the apparatus including many functions, the paper manual requires the number of pages (sheets) corresponding to descriptions of these functions. Therefore, the manual becomes huge with increased weight, and is thus difficult to carry anytime. Moreover, since the electronic manual cannot be viewed at places where a Personal Computer (PC) or the like is not installed, a user has to go to a place where a PC or the like is installed and read the electronic manual. This lacks a real-time feature.

To get around these problems, a technology has been disclosed in which a manual is held inside an apparatus, such as a printer, and the manual is output from that apparatus, thereby allowing manual information of the image processing apparatus to be obtained even without carrying a huge manual or installation of a PC or the like, and allowing complex functions of the apparatus to be used (see, for example, Japanese Patent Application Laid-Open NO. H8-174967). That is, in the technology disclosed this patent gazette, the user selects from an operation panel the number of a manual desired to be viewed, thereby allowing the manual to be printed out or displayed on the operation panel for viewing.

However, in the technology disclosed in the gazette, the user has to search for and select a part of the huge manual where the information of the function desired to be viewed is located. This operation places a heavy burden on the user. Moreover, printing out the manual every time it is viewed increases cost. Furthermore, there is another problem in which, if the manual is displayed on the operation panel of the printer or the like, since the area of a displaying unit is small, it is difficult to see the manual.

Still further, it will be more convenient for the user if a manual for a portion where abnormality occurs in the image forming apparatus or the like can be easily displayed on a large screen on a real-time basis.

SUMMARY OF THE INVENTION

It is an object of the present invention to at least partially solve the problems in the conventional technology.

According to an aspect of the present invention, there is provided a method of processing a display in a display processing system including an image processing apparatus that includes a component unit including at least one of a printer unit and a scanner unit and that performs an image processing and a portable displaying device that displays information via the image processing apparatus and a wireless communication network. The image processing apparatus includes a storage unit that stores therein related information on the component unit, an operation state of the component unit, and association information associated with relation identification information for identifying the related information. The method includes state detecting including the image processing apparatus detecting the operation state of the component unit; first transmitting/receiving including the image processing apparatus receiving user identification information unique to a user from an information storage medium of the user, the image processing apparatus transmitting received user identification information to the displaying device, and the image processing apparatus receiving authentication information indicating a successful authentication of the user identification information from the displaying device; and obtaining, upon receiving the authentication information, including the image processing apparatus obtaining the related information indicated by the relation identification information corresponding to the component unit and the operation state of the component unit. The first transmitting/receiving includes transmitting the related information and the operation state of the component unit obtained at the obtaining to the displaying device. The method further includes component detecting including the displaying device detecting a detecting unit within a predetermined range from the displaying device; authenticating including the displaying device authenticating whether the user identification information transmitted from the image processing apparatus is stored; second transmitting/receiving including the displaying device transmitting the authentication information to the image processing apparatus, and the displaying device receiving the related information and the operation state of the component unit from the image processing apparatus; and display controlling including the displaying device performing a control of the related information and the operation state of the component unit to be displayed on a displaying unit.

Furthermore, according to another aspect of the present invention, there is provided a method of processing a display in a display processing system including an image processing apparatus that includes a component unit including at least one of a printer unit and a scanner unit and that performs an image processing and a portable displaying device that displays information via the image processing apparatus and a wireless communication network. The image processing apparatus includes a state storage unit that stores therein an operation state of the component unit and state association information associated with the operation state of the component unit. The method includes detecting including the image processing apparatus detecting the operation state of the component unit near the component unit; first transmitting/receiving including the image processing apparatus receiving user identification information unique to a user from an information storage medium of the user, the image processing apparatus transmitting received user identification information to the displaying device, and the image processing apparatus receiving authentication information indicating a successful authentication of the user identification information from the displaying device; and first obtaining, upon receiving the authentication information, including the displaying device obtaining the operation state of the component unit. The first transmitting/receiving includes transmitting the operation state of the component unit to the displaying device. The method further includes component detecting including the displaying device detecting a detecting unit within a predetermined range from the displaying device; authenticating including the displaying device, authenticating whether the user identification information transmitted from the image processing apparatus is stored; second transmitting/receiving including the displaying device transmitting the authentication information to the image processing apparatus, and the displaying device receiving the operation state of the component unit from the image processing apparatus; second obtaining, upon receiving the operation state of the component unit, including the displaying device obtaining related information indicated by relation identification information corresponding to the component unit; and display controlling including the displaying device performing a control of the operation state of the component unit and the related information to be displayed on a displaying unit.

Moreover, according to still another aspect of the present invention, there is provided a method of processing a display in a display processing system including an image processing apparatus that includes a component unit including at least one of a printer unit and a scanner unit and that performs an image processing, a portable displaying device that displays information via the image processing apparatus and a wireless communication network, and a server that is connected to the displaying device via a network, transmits information to the displaying device, and stores related information regarding the component unit and association information associated with relation identification information for identifying the related information. The image processing apparatus includes a state storage unit that stores therein an operation state of the component unit and state association information associated with the operation state of the component unit. The server includes a storage unit that stores therein the related information and the association information. The method includes detecting including the image processing apparatus detecting the operation state of the component unit near the component unit; first transmitting/receiving including the image processing apparatus receiving user identification information unique to a user from an information storage medium of the user, the image processing apparatus transmitting received user identification information to the displaying device, and the image processing apparatus receiving authentication information indicating a successful authentication of the user identification information from the displaying device; and first obtaining, upon receiving the authentication, including the displaying device obtaining the operation state of the component unit. The first transmitting/receiving includes transmitting the operation state of the component unit to the server. The method further includes component detecting including the displaying device detecting a detecting unit within a predetermined range from the displaying device; authenticating including the displaying device authenticating whether the user identification information transmitted from the image processing apparatus is stored; second transmitting/receiving including the displaying device transmitting the authentication information to the image processing apparatus; third transmitting/receiving including the displaying device receiving the operation state of the component unit and the related information from the server; display controlling including the displaying device performing a control of the related information and the operation state of the component unit to be displayed on a displaying unit; second obtaining, upon receiving the operation state of the component unit, including the server obtaining the related information indicated by the relation identification information corresponding to the component unit; and fourth transmitting/receiving including the server transmitting the operation state of the component unit and the related information to the displaying device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2A is a drawing of an example of a manual-name association table stored in a storage unit;

FIG. 2B is a drawing of an example of a log-file-name association table stored in the storage unit;

FIG. 2C is a drawing of an example of a log file stored in the storage unit;

FIG. 11 is a drawing of an example of an association table of sub-manuals and user names of users who can refer to the sub-manuals;

DETAILED DESCRIPTION OF THE PREFERRED EMBODIMENTS

Exemplary embodiments of the present invention will be explained in detail below with reference to the accompanying drawings.

Figure 1:
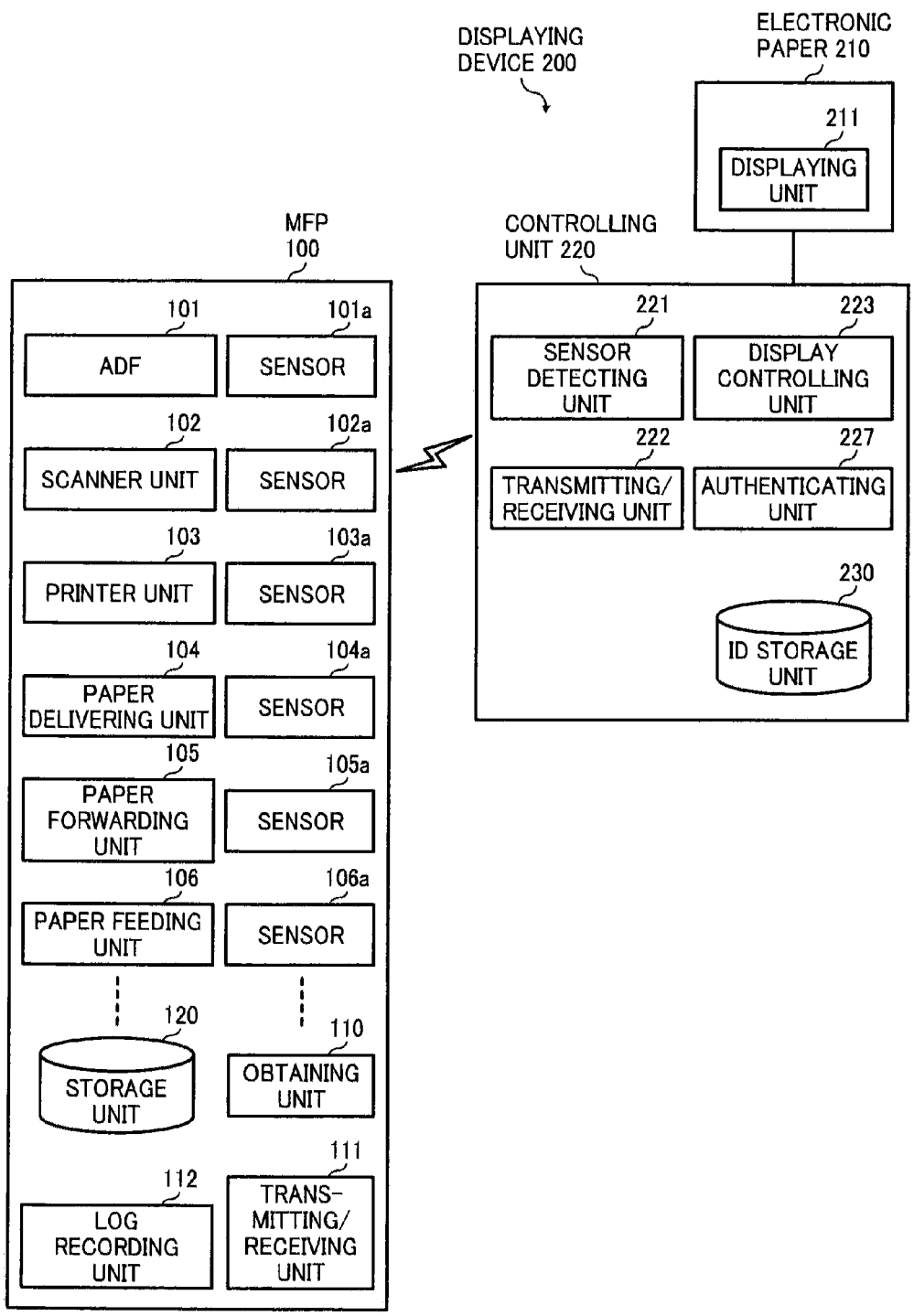
FIG. 1 is a block diagram of the configuration of a display processing system according to a first embodiment of the present invention.

A display processing system according to a first embodiment of the present invention is configured of an image processing apparatus and a displaying device. With the displaying device being near a component of the image processing apparatus, information from a sensor of that nearby component (information indicative of a state of the component, such as an operation error of that component, hereinafter, "sensor information") and a manual corresponding to that sensor information are received and displayed by the displaying device. FIG. 1 is a block diagram of the configuration of a display processing system according to the first embodiment. As depicted in FIG. 1, the display processing system according to the first embodiment includes an MFP 100 and a displaying device 200. Also, the MFP 100 and the displaying device 200 are connected to each other via a wireless communication network, such as a wireless Local Area Network (LAN). In the first embodiment, an example is depicted in which the image processing apparatus according to the present invention is applied to an MFP having a plurality of functions, such as scanner, copy, facsimile, and printer, accommodated in a single cabinet.

First, details of the MFP 100 are explained. The MFP 100 scans a document and generates image data of the scanned document, and mainly includes components, that is, an Automatic Document Feeder (ADF) 101, a scanner unit 102, a printer unit 103, a paper delivering unit 104, a paper forwarding unit 105, a paper feeding unit 106, sensors 101a to 106a, a storage unit 120, an obtaining unit 110, a transmitting/receiving unit 111, and a log recording unit 112.

The ADF 101 successively feeds a plurality of document sheets placed on a fixed position by the user to a document table, and delivers them after a process by the scanner unit 102, which will be explained below.

The scanner unit 102 scans and reads a document sheet placed by the user or fed from the ADF 101 by a Charge Coupled Device (CCD).

The printer unit 103 prints image data generated from the document sheet scanned by the scanner unit 102 onto a paper medium or the like.

The paper delivering unit 104 delivers the paper medium or the like printed by the printer unit 103 from the inside of the body of the MFP 100.

The paper forwarding unit 105 conveys the paper medium or the like from the paper feeding unit 106 to the printer unit 103 and the paper delivering unit 104 inside the body of the MFP 100.

The paper feeding unit 106 is a paper-feeding cassette having accommodated therein paper media or the like printed by the printer unit 103.

The sensors 101a to 106a are provided near the components, that is, the ADF 101, the scanner unit 102, the printer unit 103, the paper delivering unit 104, the paper forwarding unit 105, and the paper feeding unit 106, in a corresponding manner. Each sensor includes a memory, a transmitting/receiving unit, an Integrate Circuit (IC) chip formed of a Large Scale Integration (LSI) circuit that detects the state of the component, such as the ADF 101, the scanner unit 102, or the printer unit 103, and an antenna.

The storage unit 120 is a storage medium, such as a Hard Disk Drive device (HDD) or memory having stored therein a manual data (related information) which describes the components of the MFP 100, a log file of sensor information obtained through detection by the sensors 101a to 106a, a manual association table, and a log-file association table.

The manual data is stored correspondingly to the component in a manner of manual data corresponding to the ADF 101, manual data corresponding to the scanner unit 102, or the like. Such manual data has written therein functional descriptions and operating methods of each component, trouble shooting methods, and the like.

The manual association table is a table in which identifications (IDs) of the respective components and manual file names thereof (relation identification information) and manual's configuration file names are associated with one another. FIG. 2A is a drawing of an example of the manual association table stored in the storage unit 120. As depicted in FIG. 2A, the manual association table has stored therein IDs (such as 001 and 002) of the respective components, manual file names (such as AAA.doc and BBB.doc), and sub-manual names (such as aaa1.doc, bbb1.doc) in association with one another. Here, each sub-manual stores a portion representing a predetermined unit, such as a function of each component or a type of failure, obtained by classifying the contents of the manual.

The log file has recorded thereon sensor information, such as a time when each component operated, the contents of the operation, and trouble error information, and is generated by a log-file recording unit, which will be explained further below. An example of a log file of the printer unit 103 is depicted in FIG. 2C. As depicted in the drawing, the log file has recorded thereon history of the operation of the printer unit 103, such as an operation time, operation details, operator, error details, and a manual name for handling the error, in reverse chronological order.

The log-file association table is a table in which log files and components are associated with each other.

The transmitting/receiving unit 111 reads a user ID recorded on an ID card, such as an employee card, held by the user for specifying the user and transmits the user ID to the displaying device 200. Also, the transmitting/receiving unit 111 receives information from the displaying device 200 indicating that the user ID transmitted to the displaying device 200 has been successfully authenticated by the displaying device 200. Furthermore, the transmitting/receiving unit 111 transmits to the displaying device 200 the sensor information obtained by the obtaining unit 110, which will be explained further below, compilation results thereof, and manual data. Here, for example, the transmitting/receiving unit 111 performs communication according to a communication protocol of a wireless Local-Area Network (LAN), such as IEEE 802.11. This is not meant to be restrictive, and any communication protocol may be used as long as the protocol allows transmission and reception of manual data and the like.

The obtaining unit 110 obtains from the storage unit 120 the sensor information from the sensors 101a to 106a when information indicating that the user ID has been successfully authenticated is received from the displaying device 200. Also, the obtaining unit 110 reads the sensor information recorded on the log recording unit 112, which will be explained further below, and complies the read sensor information and the sensor information recorded on the log file by a predetermined unit (such as per month or quarter of the year). Furthermore, the obtaining unit 110 reads sub-manual names from the sensor information to obtain sub-manuals corresponding to the sub-manual names read from the storage unit 120.

The log recording unit 112 records the sensor information obtained by the obtaining unit 110 on the log file with the configuration ID as a key.

Figure 3:
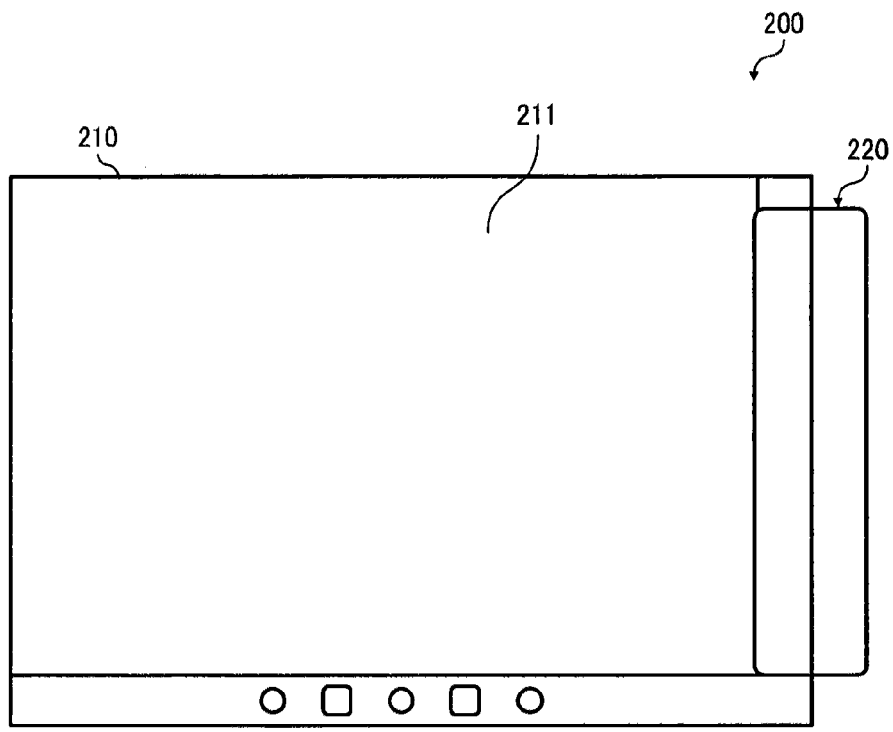
FIG. 3 is a schematic drawing of the configuration of a displaying device.

Next, details of the displaying device 200 are explained. The displaying device 200 is configured with a size and weight so as to be able to be easily carried by the user, and displays information received from the MFP 100. FIG. 3 is a schematic drawing of the configuration of the displaying device 200. As depicted in FIG. 3, the displaying device 200 mainly includes an electronic paper 210 having a displaying unit 211 and a controlling unit 220.

The electronic paper 210 has a thickness on the order of several-tenth millimeters, and has the displaying unit 211 that can display and erase data with an electric unit. Also, the electronic paper 210 is a reflective display medium expected to achieve a function "easy to view, easy to carry" of a hard copy printed on a paper medium, a function "combinability and rewritability with digital information" of a soft copy displayed on a screen of a displaying unit, and also paper-resource saving. The electronic paper has characteristics of ultra-thin-thickness and flexibility, which conventional image displaying apparatuses do not have.

Figure 4:
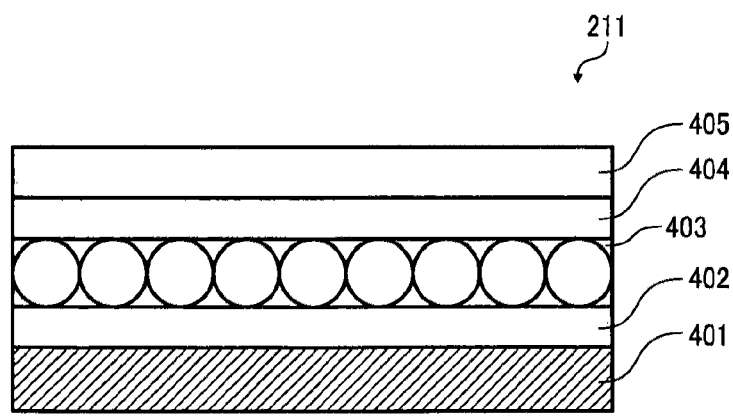
FIG. 4 is a cross-section view of the configuration of a displaying unit configuring the displaying device.

FIG. 4 is a cross-section view of an internal configuration of the displaying unit 211 of the electronic paper 210. The displaying unit 211 of the electronic paper 210 has a configuration in which, as depicted in FIG. 4, a base 401 made of paper or plastic with flexibility has laminated thereon an electrode film 402 in which a conductive layer is formed on a plastic film made of polyethylene terephthalate (PET), polyethylene naphthalate (PEN), or polyimide with excellent dimensional stability, an image display layer 403, a transparent electrode film 404 in which an active matrix electrode, a segment electrode, or a simple matrix electrode not shown is formed on a transparent plastic film made of polyethylene terephthalate (PET), polyethylene naphthalate (PEN), or polyimide with excellent dimensional stability, and a ultraviolet (UV)-cut and protective layer 405 that protects this displaying unit. With such a configuration of the displaying unit 211, the display screen of the displaying unit 211 keeps a displayed state even when power is turned off.

The controlling unit 220 mainly includes an ID storage unit 230, a sensor detecting unit 221, an authenticating unit 227, a transmitting/receiving unit 222, and a display controlling unit 223.

Figure 5:
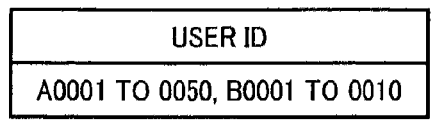
FIG. 5 is a drawing of an example of user IDs stored in an ID storage unit.

The ID storage unit 230 is a storage medium, such as a memory that stores a user ID for authenticating the user. FIG. 5 is a drawing of an example of an ID table stored in the ID storage unit 230. As depicted in FIG. 5, the ID table stored in the ID storage unit 230 has stored therein only the user IDs of the user who can use the present display system.

The sensor detecting unit 221 detects the sensors 101a to 106a positioned within a predetermined range from the displaying device 200, with the displaying device 200 provided near the sensors near the components of the MFP 100. Here, in the first embodiment, the components of the MFP 100 are detected with the displaying device 200 provided near the sensors 101a to 106a. Alternatively, the components of the MFP 100 may be detected with the displaying device 200 provided so as to make contact with the sensors 101a to 106a.

When the transmitting/receiving unit 222, which will be explained below, receives a user ID transmitted from the MFP 100, the authenticating unit 227 performs authentication by referring to the ID storage unit 230 to determine whether the received user ID is stored in the ID storage unit 230.

The transmitting/receiving unit 222 receives the user ID transmitted from the MFP 100. Also, if the ID of the user has been successfully authenticated by the authenticating unit 227, the transmitting/receiving unit 222 transmits as such to the MFP 100. Furthermore, the transmitting/receiving unit 222 receives from the MFP 100 sensor information and manual data of the component obtained by the MFP 100 receiving the information indicating that the ID of the component has been successfully authenticated by the authenticating unit 227.

The display controlling unit 223 performs control of causing the sensor information and sub-manual data received by the transmitting/receiving unit 222 to be displayed on the displaying unit 211 of the electronic paper 210.

Figure 6:
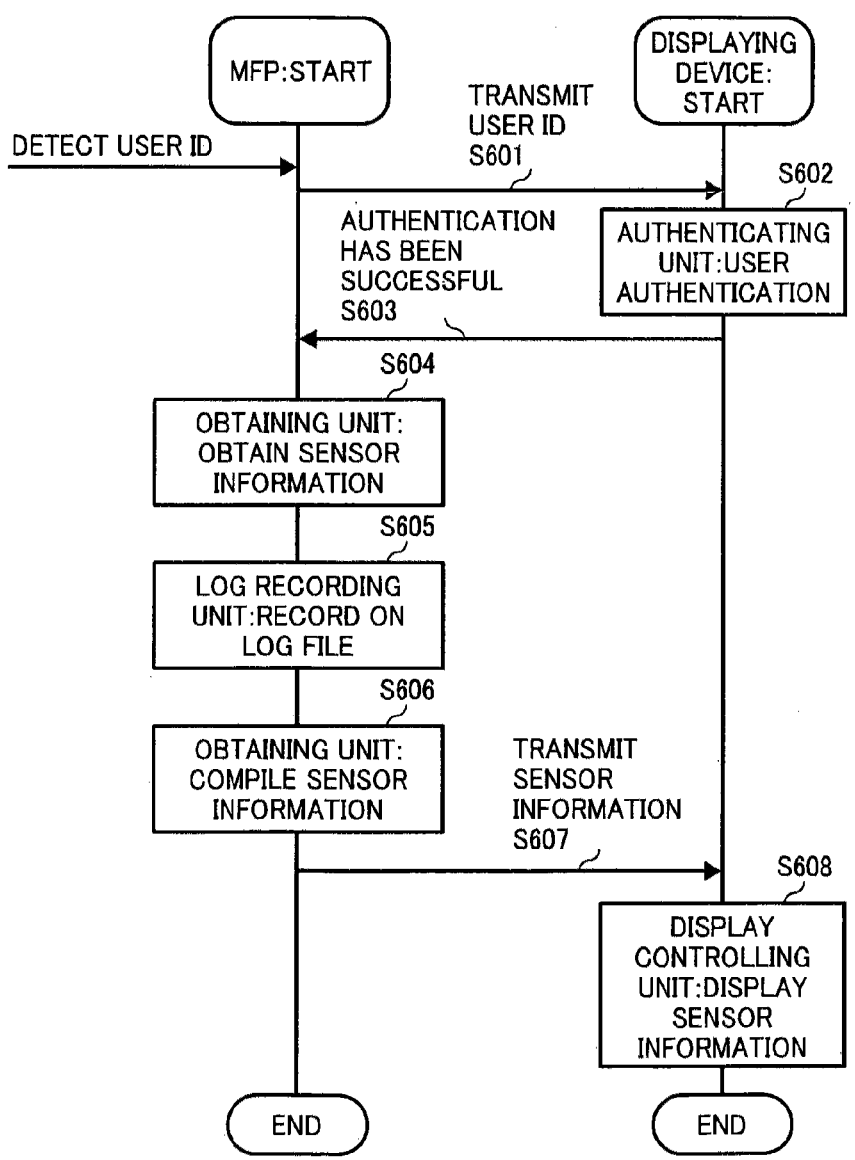
FIG. 6 is a sequence diagram of a procedure of a displaying process by the display processing system according to the first embodiment.

Next, a displaying process by the display processing system configured in the above manner is explained. FIG. 6 is a sequence diagram of a procedure of a displaying process by the display processing system according to the first embodiment. In the following example, the displaying device 200 is provided near the printer unit 103. The procedure is the same when the displaying device 200 is provided near the sensor of another component.

First, when the user brings an ID card having his or her employee ID stored therein near the MFP 100, the transmitting/receiving unit 111 of the MFP 100 detects the user ID stored in this ID card, and then transmits the user ID to the displaying device 200 (step S601).

The authenticating unit 227 then refers to the ID storage unit 230 to perform authentication to determine whether the user ID transmitted from the MFP 100 is stored (step S602).

If authentication of the ID of the component by the authenticating unit 227 has been successful, the transmitting/receiving unit 222 of the displaying device 200 transmits as such to the MFP 100 (step S603), which is received by the transmitting/receiving unit 111 of the MFP 100. When the transmitting/receiving unit 111 receives information indicating that authentication of the user ID has been successful, the obtaining unit 110 obtains sensor information from the sensors 101a to 106a (step S604).

The obtaining unit 110 then records the obtained sensor information in a log file with the configuration ID as a key (step S605). The obtaining unit 110 then reads the sensor information from the log file (for example, reads rows in which a print error character is written), and compiles their values (for example, the number of rows). Furthermore, when a sub-manual name to be referred to from the log file is recorded, the obtaining unit 110 reads the sub-manual name (for example, ccc3), and obtains a sub-manual corresponding to the sub-manual name (for example, a manual in which a print-error handling method is written) from the storage unit 120 (step S606).

The transmitting/receiving unit 111 then transmits the sensor information of the component obtained and complied by the obtaining unit 110 and the sub-manual data to the displaying device 200 (step S607), and the transmitting/receiving unit 222 of the displaying device 200 receives the sub-manual data. Next, the display controlling unit 223 causes the sensor information and sub-manual data received by the transmitting/receiving unit 222 to be displayed on the displaying unit 211 of the electronic paper 210 (step S608).

Figure 7:
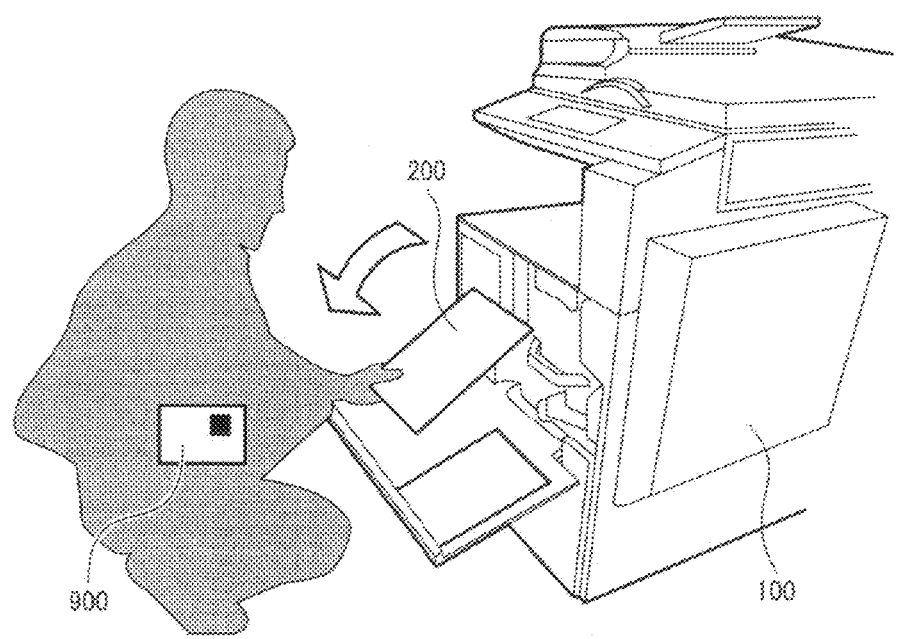
FIG. 7 is a drawing of a use state of the display processing system according to the first embodiment.

Here, an exemplary use of the display processing system according to the first embodiment is explained. FIG. 7 is a drawing of a use state of the display processing system according to the first embodiment. In FIG. 7, a user holding an ID card brings the displaying device 200 near the MFP 100.

Figure 8:
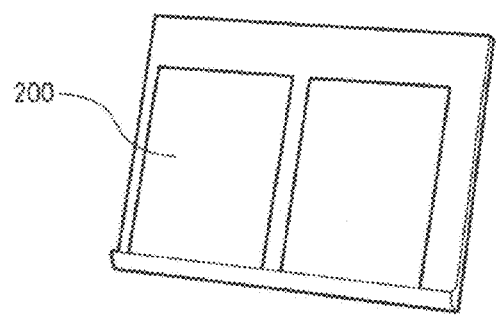
FIG. 8 is a drawing of an installation state of the displaying device according to the first embodiment.

As depicted in FIG. 7, when the user opens the cover of the MFP 100 and brings the displaying device 200 near a component, the user ID is authenticated at the displaying device 200, and the sensor information and sub-manual data of the component is displayed on the displaying device 200. FIG. 8 is a drawing that depicts an example in which the displaying device 200 is installed at the MFP 100.

Figure 9:
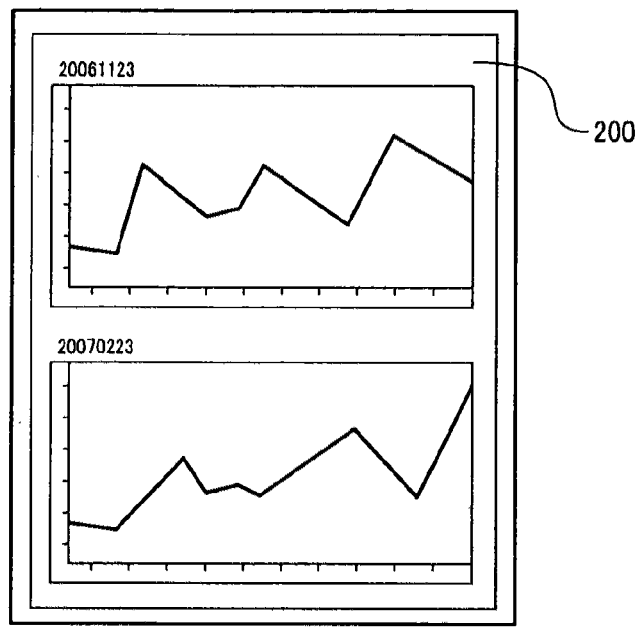
FIG. 9 is a drawing of a use state in which sensor information is complied for display on the displaying device according to the first embodiment.

An example of the displaying device 200 displaying the sensor information is depicted in FIG. 9. As depicted in the drawing, the progression of the sensor information of each component obtained and compiled by the obtaining unit 110 (for example, the progression of the number of print errors of the printer unit 103) can be displayed. With the sensor information being displayed in this manner, a measure for improvement, such as increasing the number of regular inspections, can be taken without investigating the state of each component.

Figure 10:
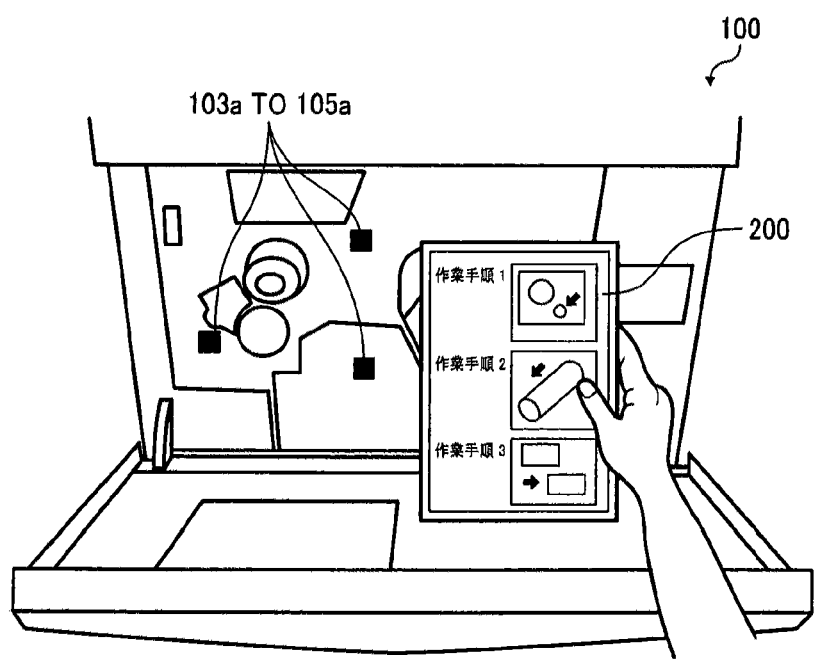
FIG. 10 is a drawing of a use state in which a sub-manual is displayed on the displaying device according to the first embodiment

An example of the displaying device 200 displaying a sub-manual is depicted in FIG. 10. As depicted in the drawing, the sub-manual (for example, ccc3) obtained by the obtaining unit 110 corresponding to the sensor information of a component (for example, print error) is displayed. The user refers to the sub-manual for handling the error. With the sub-manual corresponding to the sensor information being displayed, the failure can be handled without taking the trouble to search for a manual corresponding to the occurring failure.

Here, in the first embodiment, the printer unit 103 is taken as an example, and print-error information of the printer unit 103 is recorded as sensor information on the log file, and the number of errors is compiled for display on the displaying device 200. Alternatively, for example, a defined value or reference value, such as a standard number of prints of the printer unit 103, may be stored in advance in the storage unit 120, the number of print executions recorded on the log file may be compiled, and whether the number of print execution is within a predetermined range compared with the defined value or reference value may be displayed on the displaying device 200.

Also, in the first embodiment, authentication is performed in a manner such that whether the user ID is stored in the displaying device 200 is simply determined without distinction by user (for example, distinction by salesperson or engineer), and the sensor information is displayed on the displaying device 200. Alternatively, an ID-manual association table indicating a relation between user IDs and sub-manuals as depicted in FIG. 11 may be stored in the ID storage unit 230, thereby restricting manuals to be referred to according to the user ID. With this restriction, it is possible to make restrictions so that people other than engineers cannot conduct regular inspections. Furthermore, in this case, for users other than engineers, contact addresses of engineers can be displayed on the displaying device 200.

In this manner, in the display processing system according to the first embodiment, with the portable displaying device 200 being brought near a component of the MFP 100, the displaying device 200 authenticates the user ID, and then detects the sensors 101a to 106a provided near the components. If authentication of the user ID has been successful at the displaying device 200, information as such is transmitted to the MFP 100. Then, from the MFP 100, sensor information of the components and sub-manual data corresponding to the sensor information are received from the MFP 100, and are displayed on the displaying unit 211. With this, only by bring the displaying device 200 near the component whose sensor information and a sub-manual corresponding to the sensor information are desired to be displayed, the sensor information and the sub-manual data corresponding to the sensor information of the component desired for viewing can be obtained without requiring a search. Also, by using the thin, light-weight electronic paper 210 allowing displayed characters and the like to be easily recognized as the displaying device 200, portability, real-time feature, and viewability can be achieved. Therefore, the displaying device 200 can be easily used by elderly people and amblyopic people. Furthermore, when abnormality is detected, for example, manual data of a portion where the abnormality occurs abnormality is detected, for example, related information of a portion where the abnormality occurs or the like can be checked on a real-time basis with easily increased viewability. Therefore, more convenience to the user can be achieved.

Figure 12:
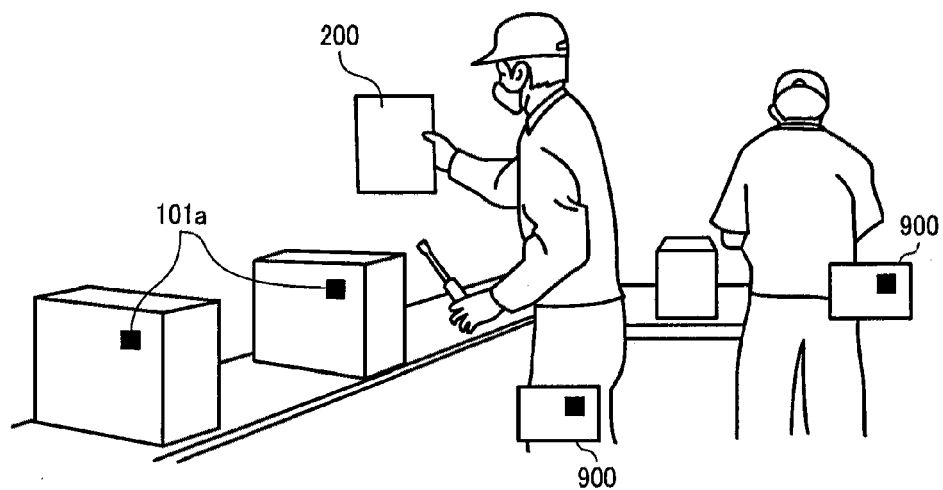
FIG. 12 is a drawing of a use state when the display processing system according to the first embodiment is applied to a product conveyed by a belt conveyor.

Still further, the display processing system according to the first embodiment can be applied to a product conveyed by a belt conveyer placed on a production line in a factory or the like. Also in this case, as with the MFP, a component of the product is provided with a sensor, and when the displaying device is brought near the component, information about a manual, operation processes, a check list by operation process, and the like is displayed on the displaying device. FIG. 12 is a drawing of a use state when the display processing system according to the first embodiment is applied to a product conveyed by a belt conveyor. In FIG. 12, an operator brings the displaying device near a component of the product whose information is desired to be displayed. With this, for example, a check list by operation process of the product, unfinished operation, the presence or absence of an error occurring at the process, and the like are displayed on the displaying device.

Figure 13:
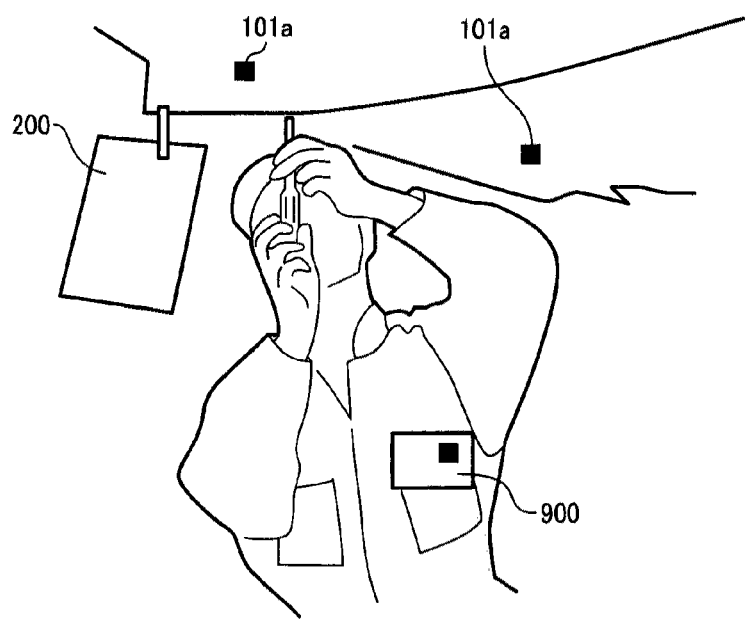
FIG. 13 is a drawing of a use state when the display processing system according to the first embodiment is applied to an automobile.

Still further, the display processing system according to the first embodiment can be applied to a vehicle, such as an automobile. Also in this case, as with the MFP, a component of an automobile, for example, a component of an engine, battery, or the like of an automobile is provided nearby with a sensor having accumulated and stored therein use information regarding that component, such as exchange time and travel distance and, when the displaying device is brought near the component whose use information is desired to be displayed, the use information of that component is displayed on the displaying device. FIG. 13 is a drawing of a use state when the display processing system according to the first embodiment is applied to an automobile. In FIG. 13, an operator at a repair shop brings the displaying device near a component of the automobile whose use information is desired to be displayed. With this, for example, the use information, such as exchange time and travel distance, of the component of the automobile is displayed on the displaying device.

In the display processing system according to the first embodiment, the displaying device is brought near the component of the image processing apparatus to receive the sensor information of the component and the manual corresponding to the sensor information stored in the image processing apparatus for display. In a display processing system according to a second embodiment of the present invention, the displaying device is brought near the component of the image processing apparatus, the displaying device receives the sensor information of the component, and causes a manual corresponding to the sensor information of the component stored in the displaying device to be displayed.

Figure 14:
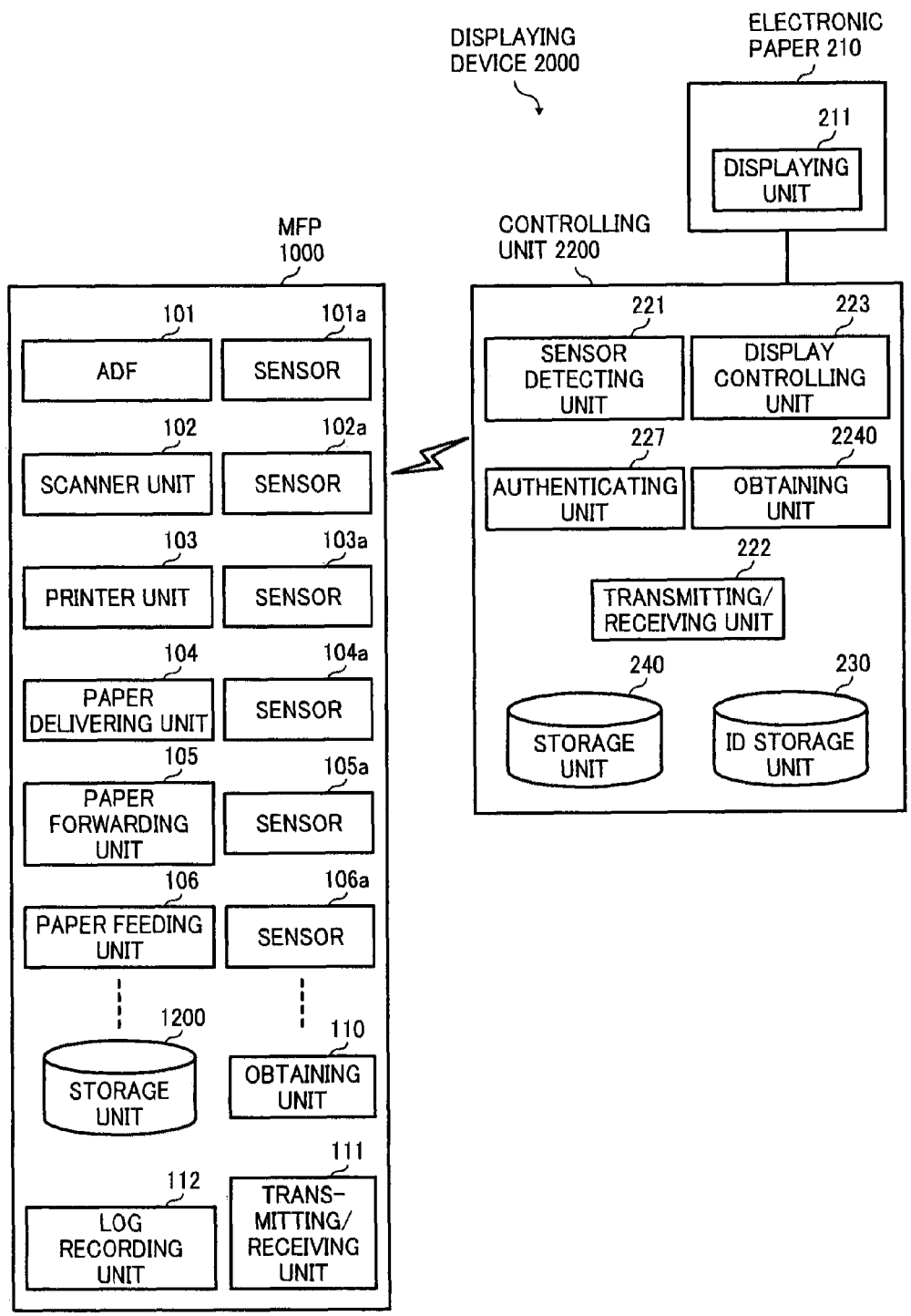
FIG. 14 is a block diagram of the configuration of a display processing system according to a second embodiment of the present invention.

FIG. 14 is a block diagram of the configuration of the display processing system according to the second embodiment. As depicted in FIG. 14, the display processing system according to the second embodiment includes an MFP 1000 and a displaying device 2000. In the second embodiment, as in the first embodiment, an example is depicted in which the image processing apparatus according to the present invention is applied to an MFP.

First, details of the MFP 1000 are explained. The MFP 1000 scans a document and generates image data of the scanned document for print, and mainly includes components, that is, the ADF 101, the scanner unit 102, the printer unit 103, the paper delivering unit 104, the paper forwarding unit 105, the paper feeding unit 106, sensors 101a to 106a, the obtaining unit 110, the transmitting/receiving unit 111, the log recording unit 112, and a storage unit 1200. Here, the MFP 1000 according to the second embodiment is different from the MFP 100 according to the first embodiment in that the storage unit 1200 is included instead of the storage unit 120. Also, the configurations and functions of the components including the ADF 101, the scanner unit 102, the printer unit 103, the paper delivering unit 104, the paper forwarding unit 105, and the paper feeding unit 106, the sensors 101a to 106a, and the log recording unit 112 are similar to those according to the first embodiment, and are therefore not explained herein.

The obtaining unit 110 obtains from the storage unit 120 the sensor information from the sensors 101a to 106a when information indicating that the user ID has been successfully authenticated is received from the displaying device 200. Also, the obtaining unit 110 reads the sensor information recorded on the log recording unit 112, which will be explained further below, and complies the read sensor information and the sensor information recorded on the log file by a predetermined unit (such as per month or quarter of the year). Furthermore, the obtaining unit 110 obtains sub-manual names from the sensor information.

The transmitting/receiving unit 111 reads a user ID recorded on an ID card, such as an employee card, held by the user for specifying the user and transmits the user ID to the displaying device 200. Also, the transmitting/receiving unit 111 receives information from the displaying device 200 indicating that the user ID transmitted to the displaying device 200 has been successfully authenticated by the displaying device 200. Furthermore, the transmitting/receiving unit 111 transmits to the displaying device 200 the sensor information obtained by the obtaining unit 110, compilation results thereof, and sub-manual data. Here, for example, the transmitting/receiving unit 111 performs communication according to a communication protocol of a wireless LAN, such as IEEE 802.11. This is not meant to be restrictive, and any communication protocol may be used as long as the protocol allows transmission and reception of manual data and the like.

The storage unit 1200 is a storage medium, such as an HDD or memory having stored therein a log file of sensor information obtained through detection by the sensors 101a to 106a in the MFP 1000, and a log-file association table.

The log file has recorded thereon sensor information, such as a time when each component operated, the contents of the operation, and trouble error information, and has the contents identical to those of the log file according to the first embodiment. Also, a log-file association table is a table in which log files and components are associated with each other, and has stored therein the contents identical to those of the log-file association table according to the first embodiment.

Next, details of the displaying device 2000 are explained. The displaying device 2000 is configured with a size and weight so as to be able to be easily carried by the user, and displays information stored in the displaying device 2000 or received from the MFP 1000. Also, as with the first embodiment, the displaying device 2000 mainly includes the electronic paper 210 having the displaying unit 211 and a controlling unit 2200. Here, the configuration and function of the electronic paper 210 having the displaying unit 211 are similar to those according to the first embodiment, and therefore are not explained herein.

The controlling unit 2200 mainly includes the transmitting/receiving unit 222, the ID storage unit 230, a storage unit 240, the sensor detecting unit 221, the authenticating unit 227, an obtaining unit 2240, and the display controlling unit 223. Here, the transmitting/receiving unit 222, the ID storage unit 230, the sensor detecting unit 221, the authenticating unit 227, and the display controlling unit 223 are similar to those according to the first embodiment, and therefore are not explained herein.

The storage unit 240 is a storage medium, such as an HDD or memory having stored therein a manual data which describes the components of the MFP 1000, and a manual association table. That is, the storage unit 240 has stored therein manuals corresponding to the respective components, such as manual data and sensor information corresponding to the ADF 101 and manual data corresponding to the scanner unit 102, having stored therein the contents identical to that of the manual data according to the first embodiment. A manual association table is a table in which IDs of the respective components and manual file names thereof (relation identification information) and manual's configuration file names are associated with one another, and has stored therein contents identical to those in the manual association table according to the first embodiment.

The obtaining unit 2240 obtains, from the storage unit 240 when the sensor information and the sub-manual name are transmitted from the MFP 1000, a sub-manual corresponding to the sub-manual name from the storage unit 240 with the sub-manual name as a key.

Figure 15:
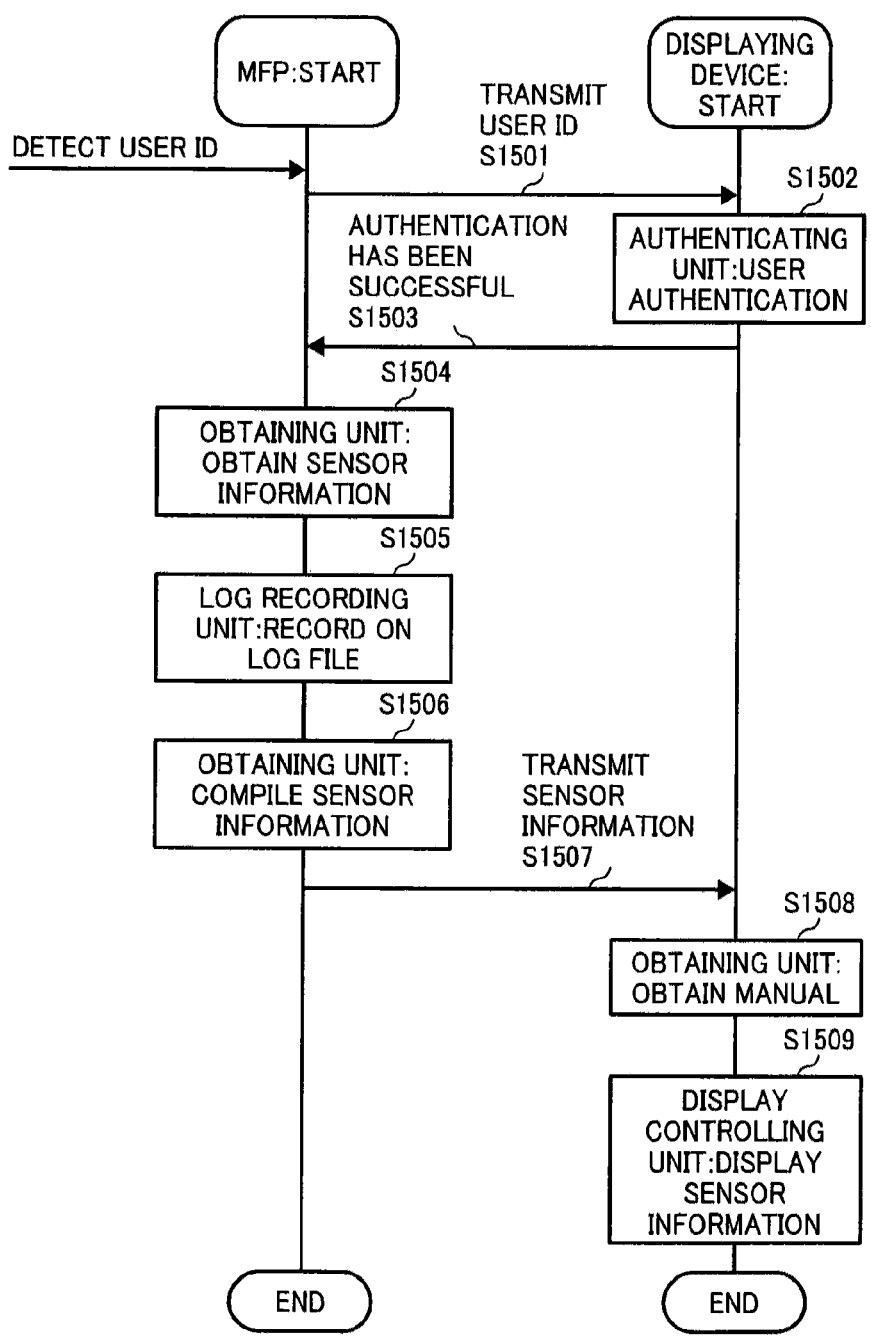
FIG. 15 is a sequence drawing of a procedure of a display process of the display processing system according to the second embodiment.

Next, a display process of the display processing system configured as above is explained. FIG. 15 is a sequence drawing of a procedure of the display process of the display processing system according to the second embodiment.

First, processes from transmission of the user ID by the transmitting/receiving unit 111 of the MFP 1000, user authentication and transmission of information indicative of the successful authentication result to the MFP 1000 by the authenticating unit 227 of the displaying device 2000, obtainment of the sensor information by the obtaining unit 110 of the MFP 1000, to recording on the log file by the log recording unit of the MFP 1000 (steps S1501 to S1505) are similar to those according to the first embodiment (step S601 to S605), and therefore are not described herein.

When the obtained sensor information is recorded on the log file, the obtaining unit 110 reads the sensor information from the log file (for example, reads a row in which a character of print error is written), complies their values (for example, the number of rows), and also obtains a sub-manual name (step S1506). The obtaining unit 110 then transmits the compiled sensor information and the sub-manual name to the displaying device 2000 (step S1507).

Next, when the sensor information is transmitted, the obtaining unit 2240 of the displaying device 2000 obtains a sub-manual corresponding to the sub-manual name (for example, a manual in which a print-error handling method is written) from the storage unit 240 with the sub-manual name transmitted from the MFP 100 as a key (step S1508).

The display controlling unit 223 then causes the sensor information transmitted from the MFP 1000 and the sub-manual obtained by the obtaining unit 2240 to be displayed on the displaying unit 211 of the electronic paper 210 (step S1509).

In this manner, in the display processing system according to the second embodiment, with the portable displaying device 2000 being brought near a component of the MFP 1000, the displaying device 2000 authenticates the user ID, and then detects the sensors 101*a* to 106*a* provided near the components. If authentication of the received user ID has been successful at the displaying device 2000, information as such is transmitted to the MFP 1000. Then, sensor information of the components is received from the MFP 1000, and sub-manual data corresponding to the sensor information is obtained from the storage unit 240 and displayed on the displaying unit 211. With this, only by bring the displaying device 2000 near the component whose sensor information and a sub-manual are desired to be displayed, the sensor information and the sub-manual data corresponding to the sensor information of the component desired for viewing can be obtained without requiring a search. Also, by using the thin, light-weight electronic paper 210 allowing displayed characters and the like to be easily recognized as the displaying device 2000, portability, real-time feature, and viewability can be achieved. Therefore, the displaying device 200 can be easily used by elderly people and amblyopic people. Furthermore, when abnormality is detected, for example, manual data of a portion where the abnormality occurs abnormality is detected, for example, related information of a portion where the abnormality occurs or the like can be checked on a real-time basis with easily increased viewability. Therefore, more convenience to the user can be achieved.

In the display processing system according to the first embodiment, the displaying device is brought near the component of the image processing apparatus to receive the sensor information of the component and the manual corresponding to the sensor information stored in the image processing apparatus for display. In a display processing system according to a third embodiment of the present invention, the displaying device is brought near the component of the image processing apparatus, the displaying device receives the sensor information of the component, and receives a manual corresponding to the sensor information of the component stored in a server for display.

Figure 16:
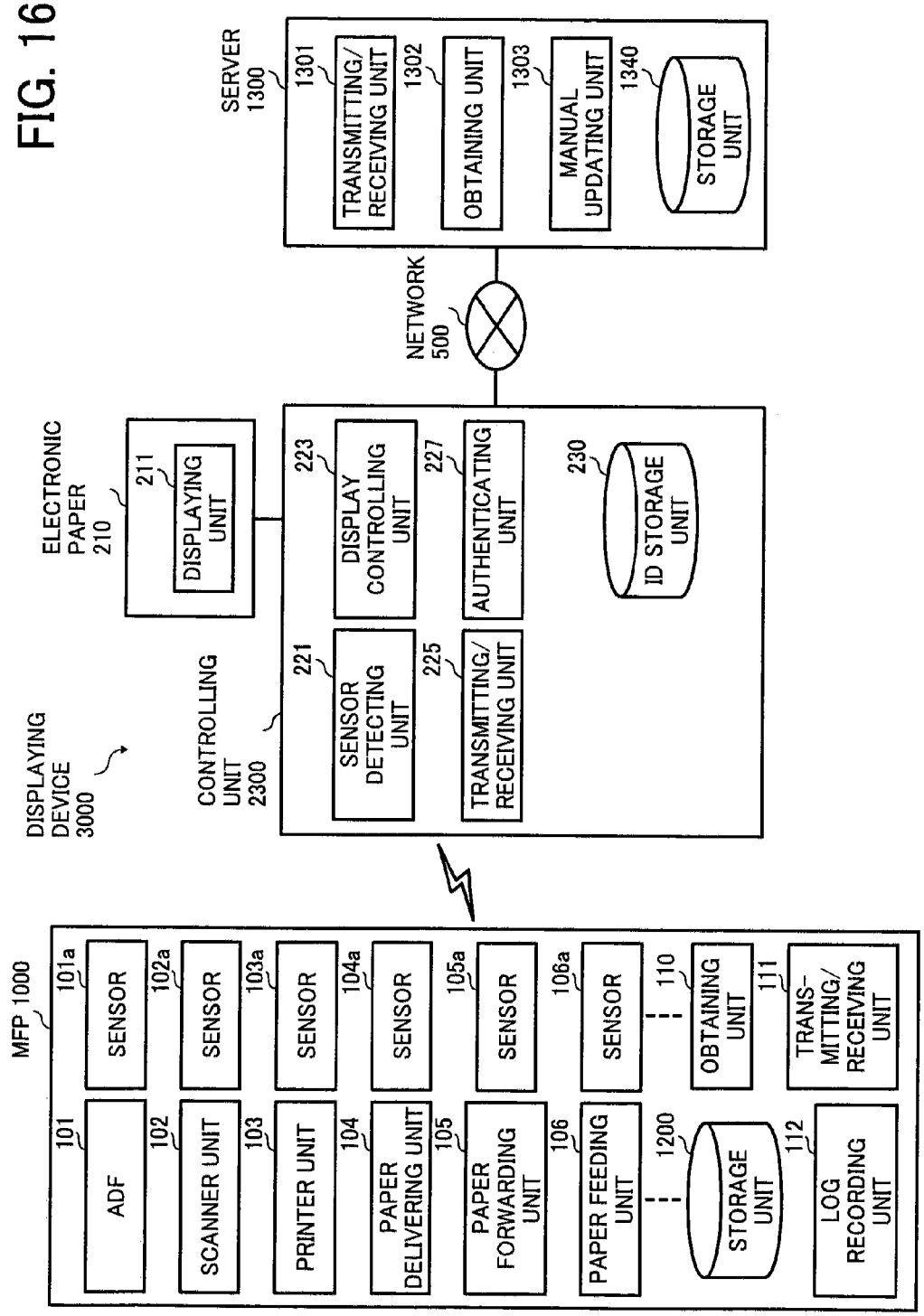
FIG. 16 is a block diagram of the configuration of a display processing system according to a third embodiment of the present invention.

FIG. 16 is a block diagram of the configuration of the display processing system according to the third embodiment. As depicted in FIG. 16, the display processing system according to the third embodiment includes an MFP 1000, a displaying device 3000, and a server 1300. Also, the displaying device 3000 and the server 1300 are connected via a network 500, such as a telephone line, a wireless network, or the Internet. In the third embodiment, as with the first embodiment, an example is depicted in which the image processing apparatus according to the present invention is applied to an MFP.

First, since details of the MFP 1000 are similar to the configuration and functions of the MFP according to the second embodiment, and therefore are not explained herein.

Next, details of the displaying device 3000 are explained. The displaying device 3000 is configured with a size and weight so as to be able to be easily carried by the user, and receives and displays information stored in the server 1300, which will be explained further below. Also, as with the first embodiment, the displaying device 3000 mainly includes the electronic paper 210 having the displaying unit 211 and a controlling unit 2300. Here, the configuration and function of the electronic paper 210 having the displaying unit 211 are similar to those according to the first embodiment, and therefore are not explained herein.

The controlling unit 2300 mainly includes the ID storage unit 230, the sensor detecting unit 221, the authenticating unit 227, a transmitting/receiving unit 225, and the display controlling unit 223. Here, the ID storage unit 230, the sensor detecting unit 221, the authenticating unit 227, and the display controlling unit 223 are similar to those according to the first or second embodiment, and therefore are not explained herein.

The transmitting/receiving unit 225 receives a user ID transmitted from the MFP 1000. Also, if authentication of the user ID by the authenticating unit 227 has been successful, the transmitting/receiving unit 225 transmits to the MFP 1000 information indicating as such. Furthermore, the transmitting/receiving unit 225 receives the sensor information of the component obtained by the MFP 1000 and the sub-manual data from the server 1300.

Next, details of the server 1300 are explained. Upon request from the displaying device 3000, the server 1300 transmits to the displaying device 3000 the information stored in the server 1300 and the information received from the MFP 1000. The server 1300 mainly includes a storage unit 1340, a transmitting/receiving unit 1301, an obtaining unit 1302, and a manual updating unit 1303.

The storage unit 1340 is a storage medium, such as an HDD or memory having stored therein a manual data (related information) which describes the components of the MFP 1000 and a manual association table. The manual association table is a table in which IDs of the respective components and manual file names thereof (relation identification information) and manual's configuration file names are associated with one another, and has the contents identical to those of the manual association table according to the first embodiment.

The transmitting/receiving unit 1301 receives sensor information and a sub-manual name from the MFP 1000. Also, the transmitting/receiving unit 1301 transmits the received sensor information and the sub-manual obtained from the obtaining unit 1302, which will be explained below, to the displaying device 3000.

With the sub-manual name received from the MFP 1000 by the transmitting/receiving unit 1301 as a key, the obtaining unit 1302 obtains a sub-manual corresponding to the sub-manual name.

The manual updating unit 1303 regularly or irregularly updates the manual data stored in the storage unit 1340.

Figure 17:
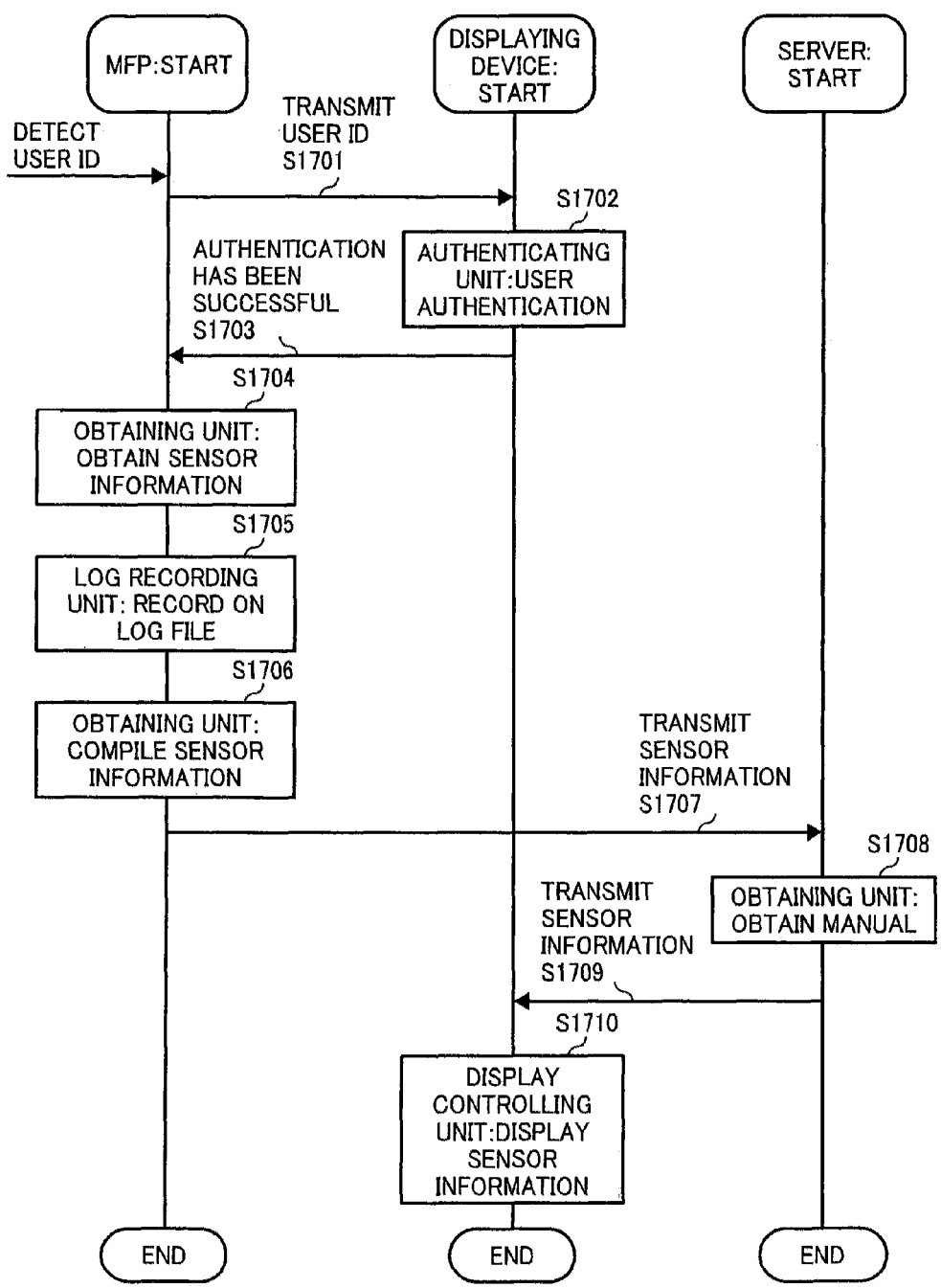
FIG. 17 is a sequence diagram of a procedure of a display process of the display processing system according to the third embodiment.

Next, a display process of the display processing system configured as above is explained. FIG. 17 is a sequence diagram of a procedure of the display process of the display processing system according to the third embodiment.

First, processes from transmission of the user ID by the transmitting/receiving unit 111 of the MFP 1000, user authentication and transmission of information indicative of the successful authentication result to the MFP 1000 by the authenticating unit 227 of the displaying device 3000, obtainment of the sensor information by the obtaining unit 110 of the MFP 1000, to recording on the log file by the log recording unit of the MFP 1000 (steps S1701 to S1706) are similar to those according to the second embodiment (step S1501 to S1506), and therefore are not described herein.

After the process of compiling the sensor information and the process of obtaining the sub-manual name by the obtaining unit 110 end, the transmitting/receiving unit 111 transmits the compiled sensor information and the sub-manual name to the server 1300 (step S1707).

Next, when the sensor information and the sub-manual name are transmitted, an obtaining unit 130 of the server 1300 obtains a sub-manual corresponding to the sub-manual name (for example, a manual in which a print-error handling method is written) from the storage unit 1340 with the transmitted sub-manual name as a key (step S1708). The transmitting/receiving unit 1301 then transmits the received sensor information and the obtained sub-manual to the displaying device 3000 (step S1709).

The display controlling unit 223 then causes the sensor information and the sub-manual transmitted from the server 1300 to be displayed by the displaying unit 211 of the electronic paper 210 (step S1710).

In this manner, in the display processing system according to the third embodiment, with the portable displaying device 3000 being brought near a component of the MFP 1000, the displaying device 3000 authenticates the user ID, and then detects the sensors 101*a* to 106*a* provided near the components. If authentication of the user ID has been successful at the displaying device 3000, information as such is transmitted to the MFP 100. Upon reception of the information, the MFP 100 then transmits the sensor information to the server 1300. Upon reception of the sensor information, the server 1300 obtains sub-manual data corresponding to the sensor information and transmits the obtained sub-manual data to the displaying device 3000. The displaying device 3000 then causes these pieces of information to be displayed by the displaying unit 211. With this, only by bring the displaying device 200 near the component whose sensor information and a sub-manual are desired to be displayed, the sub-manual data and the sensor information of the component desired for viewing can be obtained without requiring a search. Also, by using the thin, light-weight electronic paper 210 allowing displayed characters and the like to be easily recognized as the displaying device 3000, portability, real-time feature, and viewability can be achieved. Therefore, the displaying device 3000 can be easily used by elderly people and amblyopic people. Furthermore, since the sub-manual data of each component stored in the server 1300 is regularly or irregularly updated, the user can obtain new, updated sub-manual data. For example, it is possible to change the sub-manual data immediately before sale of the MFP 1000 and add a troubleshooting method after sale. Still further, when abnormality is detected, for example, manual data of a portion where the abnormality occurs abnormality is detected, for example, related information of a portion where the abnormality occurs or the like can be checked on a real-time basis with easily increased viewability. Therefore, more convenience to the user can be achieved.

Figure 18:
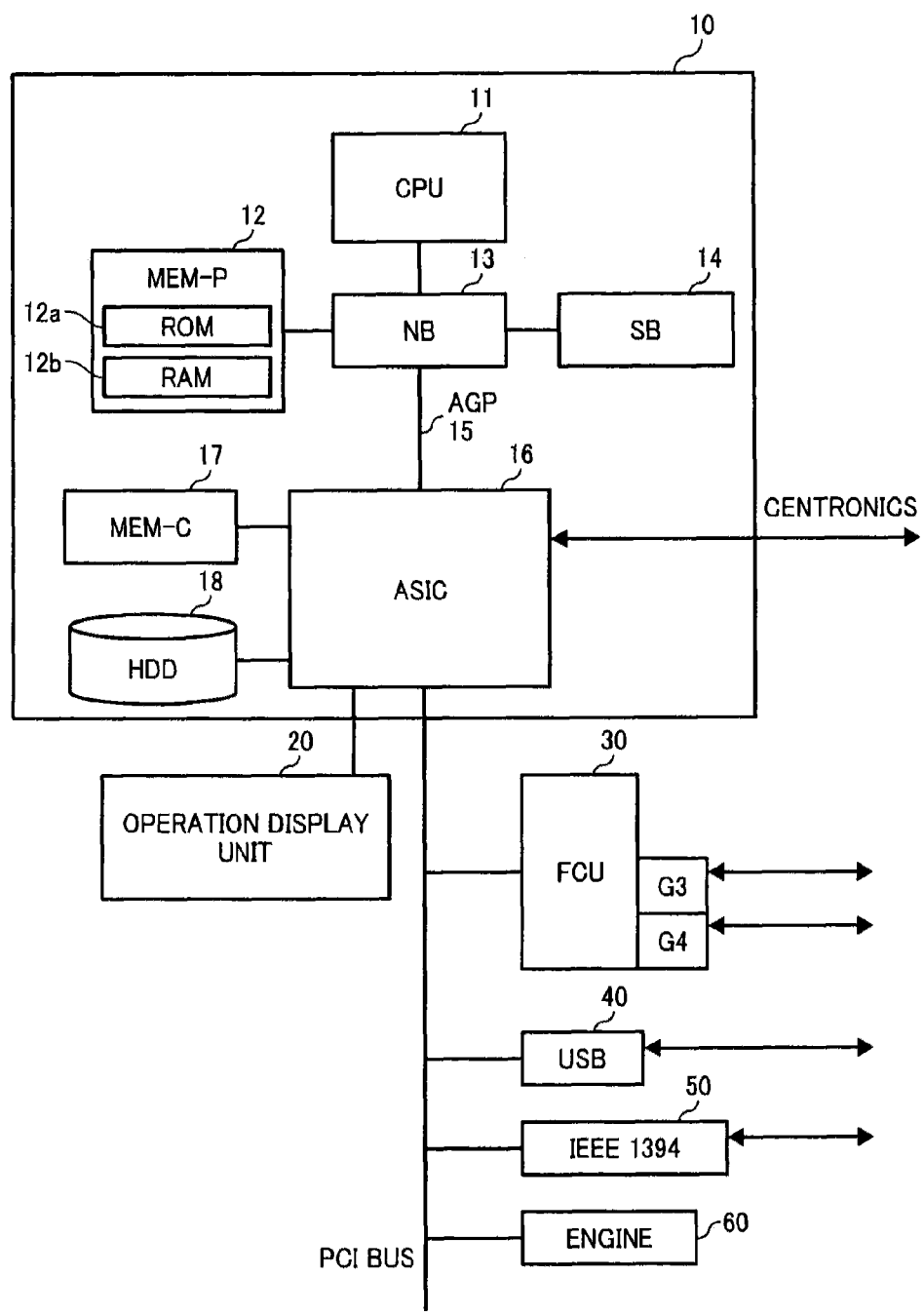
FIG. 18 is a block diagram of a hardware configuration of a MultiFunctional Peripheral (MFP) according to the first to the third embodiments.

FIG. 18 is a block diagram of a hardware configuration of the MFP according to the first to the third embodiments. As depicted in the drawing, the MFPs 100 and 1000 have a configuration in which a controller 10 and an engine 60 are connected via a Peripheral Component Interconnect (PCI) bus. The controller 10 is a controller that controls the entire MFPs 100 and 1000, rendering, communication, and inputs from an operation panel not shown. The engine 60 is, for example, a printer engine connectable to the PCI bus. Examples of the engines 60 are, for example, a monochrome plotter, a one-drum color plotter, a four-drum color plotter, a scanner, or a facsimile unit. Here, the engine 60 includes, in addition to a so-called engine unit, such as a plotter, an image processing unit for error diffusion or gamma transformation.

The controller 10 includes a CPU 11, a northbridge (NB) 13, a system memory (MEM-P) 12, a southbridge (SB) 14, a local memory (MEM-C) 17, an Application Specific Integrated Circuit (ASIC) 16, and a hard disk drive (HDD) 18, with the NB 13 and the ASIC 16 being connected via an Accelerated Graphics Port (AGP) bus 15. Also, the MEM-P 12 further includes a Read Only Memory (ROM) 12*a* and a Random Access Memory (RAM) 12*b*.

The CPU 11 performs the entire control over the MFPs 100 and 1000 has a chip set formed of the NB 13, the MEM-P 12, and the SB 14. Via this chip set, the CPU 11 is connected to other devices.

The NB 13 is a bridge for connection of the CPU 11 with the MEM-P 12, the SB 14, and the AGP 15, and has a memory controller that controls read and write with respect to the MEM-P 12, a PCI master, and an AGP target.

The MEM-P 12 is a system memory for use as a memory for storing programs and data, a memory for developing the programs and data, or a rendering memory for printers, and includes the ROM 12*a* and the RAM 12*b*. The ROM 12*a* is a read-only memory for use as a memory for storing programs and data, whilst the RAM 12*b* is a writable and readable memory for use as a memory for developing the programs and data and as a rendering memory for printers.

The SB 14 is a bridge for connection between the NB 13 and PCI devices and peripheral devices. The SB 14 is connected to the NB 13 via the PCI bus. To this PCI bus, the network interface (I/F) unit is connected, for example.

The ASIC 16 is an integrated circuit (IC) dedicated for image processing having hardware components for image processing, serving as a bridge connecting the AGP 15, the PCI bus, the HDD 18, and the MEM-C 17. The ASIC 16 includes a PCI target and an AGP master, an arbiter (ARB), which is a core of the ASIC 16, a memory controller that controls the MEM-C 17, a plurality of Direct Memory Access Controllers (DMAC) for rotating image data with hardware logic, and a PCI unit for data transfer via the PCI bus with the engine 60. To the ASIC 16, a Fax Control Unit (FCU) 30, a Universal Serial Bus (USB) 40, and an IEEE 1394 interface 50 are connected. An operation display unit 20 is directly connected to the ASIC 16.

The MEM-C 17 is a local memory for use as an image buffer for copy or a code buffer. The HDD 18 is a storage for storing image data, programs, font data, and forms.

The AGP 15 is a bus interface for a graphics accelerator card suggested for increasing speed of graphic processing and, by directly accessing the MEM-P 12 with a high throughput, increases the speed of the graphic accelerator card.

A display processing program to be executed on the MFPs 100 and 1000 according to the present embodiments is provided as being incorporated in advance in a ROM or the like.

Also, the display processing program to be executed on the MFP 100 in the first embodiment may be configured to be recorded as a file in an installable or executable format on a computer-readable recording medium for provision, such as a Compact Disk-Read Only Memory (CD-ROM), a flexible disk (FD), a Compact Disk-Recordable (CD-R), or a Digital Versatile Disk (DVD).

Furthermore, the display processing program to be executed on the MFP 100 in the first embodiment may be configured to be stored on a computer connected to a network, such as the Internet, and is downloaded via the network for provision. Also, the display processing program to be executed on the MFP 100 in the first embodiment may be configured to be provided or distributed via a network, such as the Internet.

The display processing program to be executed on the MFP 100 in the first embodiment has a module configuration including the each unit (the obtaining unit and the transmitting/receiving unit). As actual hardware, the CPU (processor) reads the display processing program from the ROM for execution, thereby loading each unit onto a main storage device and generating the obtaining unit, the transmitting/receiving unit, and the log recording unit on the main storage device.

Figure 19:
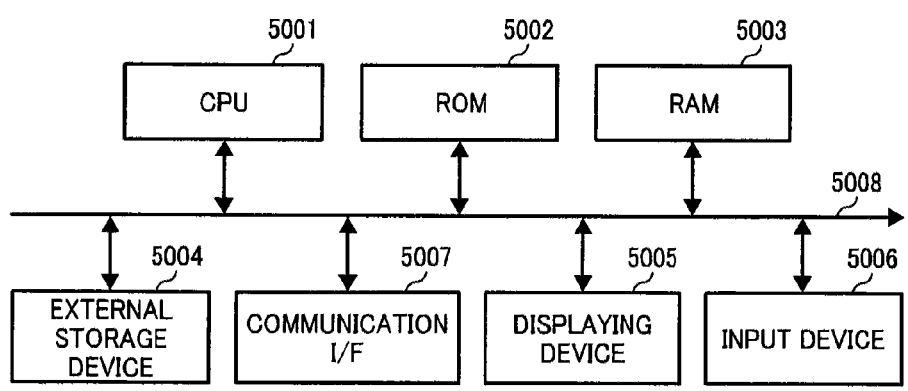
FIG. 19 is a drawing of a hardware configuration of the displaying device according to the first to the third embodiments.

FIG. 19 is a drawing of a hardware configuration of the displaying device according to the first to the third embodiments. The displaying device according to the first to the third embodiments has a hardware configuration using a normal computer, including a controlling device such as a CPU 5001, a storage device such as a ROM 5002 or a RAM 5003, an external storage device 5004 such as a HDD and a CD drive device, a displaying device 5005 (electronic paper) such as a displaying device, an input device 5006 such as a keyboard or a mouse, a communication I/F 5007, and a bus 5008 connecting these components.

The display processing program to be executed on the displaying device according to the first to the third embodiments is recorded as a file in an installable or executable format on a computer-readable recording medium for provision, such as a CD-ROM, an FD, a CD-R, or a DVD.

Furthermore, the display processing program to be executed on the displaying device according to the first to the third embodiments may be configured to be stored on a computer connected to a network, such as the Internet, and is downloaded via the network for provision. Also, the display processing program to be executed on the displaying device according to the first to the third embodiments may be configured to be provided or distributed via a network, such as the Internet.

Still further, the display processing program according to the first to the third embodiments may be provided as being incorporated in advance in a ROM or the like. The display processing program to be executed on the displaying device according to the first to the third embodiments has a module configuration including the each unit (the sensor detecting unit, the transmitting/receiving unit, the authenticating unit, the obtaining unit, and the display controlling unit). As actual hardware, the CPU (processor) reads the display processing program from the storage medium for execution, thereby loading each unit onto a main storage device and generating the sensor detecting unit, the transmitting/receiving unit, the authenticating unit, the obtaining unit, and the display controlling unit on the main storage device.

As described above, according to an aspect of the present invention, the related information of a component of the image processing apparatus can be immediately displayed on a portable displaying device. Therefore, an effect can be achieved such that the related information desired to be viewed can be obtained in a portable, real-time, and viewable manner without requiring a search. Also, according to the present invention, when abnormality is detected, for example, related information of a portion where the abnormality occurs or the like can be checked on a real-time basis with easily increased viewability. Therefore, an effect of more convenience to the user can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of processing a display in a display processing system including an image processing apparatus, wherein the image processing apparatus includes a storage unit that stores therein related information on a component unit, an operation state of the component unit, and association information associated with relation identification information for identifying the related information, the method comprises:
   a state detecting step including the image processing apparatus detecting the operation state of the component unit;
   a first transmitting/receiving step including the image processing apparatus receiving user identification information unique to a user from an information storage medium of the user, the image processing apparatus transmitting received user identification information to a portable displaying device, and the image processing apparatus receiving authentication information indicating a successful authentication of the user identification information from the portable displaying device;
   an obtaining step, performed upon receiving the authentication information, including the image processing apparatus obtaining the related information indicated by the relation identification information corresponding to the component unit and the operation state of the component unit, and wherein the first transmitting/receiving step includes transmitting the related information and the operation state of the component unit obtained at the obtaining step to the portable displaying device;
   a component detecting step including the portable displaying device detecting a detecting unit within a predetermined range from the portable displaying device;
   an authenticating step including the portable displaying device authenticating whether the user identification information transmitted from the image processing apparatus is stored;
   a second transmitting/receiving step including: the portable displaying device transmitting the authentication information to the image processing apparatus, and the portable displaying device receiving the related information and the operation state of the component unit from the image processing apparatus; and
   a display controlling step including the portable displaying device performing a control of the related information and the operation state of the component unit to be displayed on a displaying unit.

2. The method according to claim 1, wherein the association information includes the operation state of the component unit as log information, and the obtaining step includes collecting the log information for each component unit.

3. The method according to claim 1, wherein the association information includes operation association information regarding the operation state of the component unit, and the obtaining step includes obtaining the operation association information based on the operation state of the component unit.

4. A method of processing a display in a display processing system including an image processing apparatus, wherein the image processing apparatus includes a state storage unit that stores therein an operation state of a component unit and state association information associated with the operation state of the component unit, the method comprises:
   a detecting step including the image processing apparatus detecting the operation state of the component unit near the component unit;
   a first transmitting/receiving step including the image processing apparatus receiving user identification information unique to a user from an information storage medium of the user, the image processing apparatus transmitting received user identification information to a portable displaying device, and the image processing apparatus receiving authentication information indicating a successful authentication of the user identification information from the portable displaying device;

a first obtaining step, performed upon receiving the authentication information, including the portable displaying device obtaining the operation state of the component unit, the first transmitting/receiving step includes transmitting the operation state of the component unit to the portable displaying device;

a component detecting step including the portable displaying device detecting a detecting unit within a predetermined range from the portable displaying device;

an authenticating step including the portable displaying device authenticating whether the user identification information transmitted from the image processing apparatus is stored;

a second transmitting/receiving step including the portable displaying device transmitting the authentication information to the image processing apparatus, and the portable displaying device receiving the operation state of the component unit from the image processing apparatus;

a second obtaining step, performed upon receiving the operation state of the component unit, including the portable displaying device obtaining related information indicated by relation identification information corresponding to the component unit; and a display controlling step including the portable displaying device performing a control of the operation state of the component unit and the related information to be displayed on a displaying unit.

5. The method according to claim 4, wherein the state association information includes the operation state of the component unit as log information, and the first obtaining step includes collecting the log information for each component unit.

6. The method according to claim 4, wherein the state association information includes operation association information regarding the operation state of the component unit, the first obtaining step includes obtaining the operation association information based on the operation state of the component unit, and the second transmitting/receiving step includes transmitting the operation association information to the portable displaying device.

7. A method of processing a display in a display processing system including an image processing apparatus, wherein the image processing apparatus includes a state storage unit that stores therein an operation state of a component unit and state association information associated with the operation state of the component unit, the method comprises:

a detecting step including the image processing apparatus detecting the operation state of the component unit near the component unit;

a first transmitting/receiving step including the image processing apparatus receiving user identification information unique to a user from an information storage medium of the user, the image processing apparatus transmitting received user identification information to the portable displaying device, and the image processing apparatus receiving authentication information indicating a successful authentication of the user identification information from the portable displaying device;

a first obtaining step, performed upon receiving the authentication, including the portable displaying device obtaining the operation state of the component unit, the first transmitting/receiving step includes transmitting the operation state of the component unit to the a server, wherein the server includes a storage unit that stores therein the related information and the association information;

a component detecting step including the portable displaying device detecting a detecting unit within a predetermined range from the displaying device;

an authenticating step including the portable displaying device authenticating whether the user identification information transmitted from the image processing apparatus is stored;

a second transmitting/receiving step including the portable displaying device transmitting the authentication information to the image processing apparatus;

a third transmitting/receiving step including the portable displaying device receiving the operation state of the component unit and the related information from the server;

a display controlling step including the portable displaying device performing a control of the related information and the operation state of the component unit to be displayed on a displaying unit;

a second obtaining step, performed upon receiving the operation state of the component unit, including the server obtaining the related information indicated by the relation identification information corresponding to the component unit; and a fourth transmitting/receiving step including the server transmitting the operation state of the component unit and the related information to the portable displaying device.

8. The method according to claim 7, further comprising an updating step including the server updating the related information included in the association information.

9. The method according to claim 7, wherein the state association information includes the operation state of the component unit as log information, and the first obtaining step includes collecting the operation state of the component unit included in the log information for each component unit.

10. The method according to claim 7, wherein the state association information includes operation association information regarding the operation state of the component unit, the first obtaining step includes obtaining the operation association information based on the operation state of the component unit, and the first transmitting/receiving step includes transmitting the operation association information to the portable displaying device.

* * * * *